(12) United States Patent
Kuzawa et al.

(10) Patent No.: US 12,742,080 B2
(45) Date of Patent: Sep. 22, 2026

(54) INK COMPOSITION, LIGHT-BLOCKING MEMBER AND IMAGE DISPLAY DEVICE

(71) Applicant: NATOCO CO., LTD., Miyoshi (JP)

(72) Inventors: Masahiro Kuzawa, Nagoya (JP); Yoshihiko Yamakado, Nagoya (JP)

(73) Assignee: NATOCO Co., Ltd., Miyoshi (JP)

( * ) Notice: Subject to any disclaimer, the term of this patent is extended or adjusted under 35 U.S.C. 154(b) by 77 days.

(21) Appl. No.: 18/850,132

(22) PCT Filed: Feb. 9, 2023

(86) PCT No.: PCT/JP2023/004298
§ 371 (c)(1),
(2) Date: Sep. 24, 2024

(87) PCT Pub. No.: WO2023/188856
PCT Pub. Date: Oct. 5, 2023

(65) Prior Publication Data

US 2025/0206970 A1 Jun. 26, 2025

(30) Foreign Application Priority Data

Mar. 30, 2022 (JP) ................................ 2022-054727

(51) Int. Cl.
*C09D 11/101* (2014.01)
*C09D 11/324* (2014.01)
(Continued)

(52) U.S. Cl.
CPC .......... *C09D 11/101* (2013.01); *C09D 11/324* (2013.01); *C09D 11/38* (2013.01); *G02F 1/133512* (2013.01)

(58) Field of Classification Search
None
See application file for complete search history.

(56) References Cited

U.S. PATENT DOCUMENTS

2020/0157368 A1 5/2020 Park et al.
2021/0147352 A1* 5/2021 Nakao .................. C07C 309/19

FOREIGN PATENT DOCUMENTS

JP 2014196475 A 10/2014
JP 2015199815 A 11/2015
(Continued)

OTHER PUBLICATIONS

International Search Report and Written Opinion issued on Apr. 25, 2023, in corresponding International Application No. PCT/JP2023/004298, 12 pages.

*Primary Examiner* — Laura C Powers
(74) *Attorney, Agent, or Firm* — Maier & Maier, PLLC

(57) ABSTRACT

An ink composition contains a light-blocking agent (A), a cationically polymerizable compound (B), a photoacid generator (C) and a sensitizer (D). The volume concentration of the light-blocking agent (A) with respect to the total volume of solids in the ink composition is 0.3% to 12%. The cationically polymerizable compound (B) contains a metal element-containing compound (B1) that has a cationically polymerizable group and a hydrolyzable group. The content of the metal element-containing compound (B1) is 5 parts by mass to 80 parts by mass if all the solids in the ink composition are taken as 100 parts by mass. The sensitizer (D) contains a compound (D1) that has an anthracene skeleton.

15 Claims, 1 Drawing Sheet

(51) Int. Cl.
*C09D 11/38* (2014.01)
*G02F 1/1335* (2006.01)

(56) References Cited

FOREIGN PATENT DOCUMENTS

| | | | |
|---|---|---|---|
| JP | 2018026517 | A | 2/2018 |
| JP | 2021508743 | A | 3/2021 |
| JP | 2021161401 | A | 10/2021 |
| WO | 2021049331 | A1 | 3/2021 |

* cited by examiner

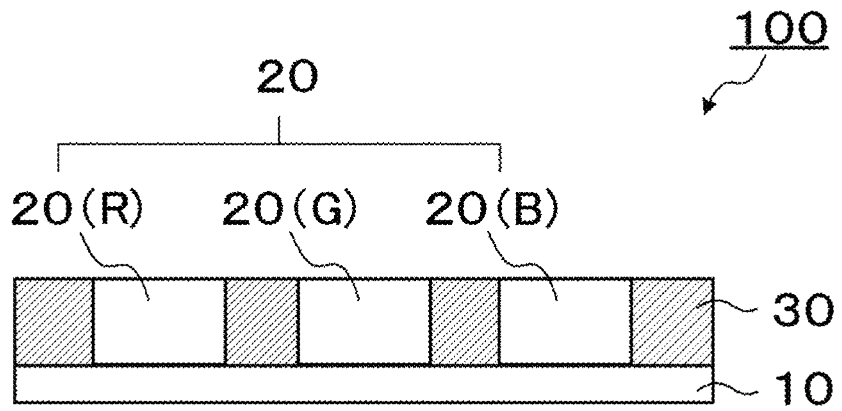
100
20
20(R)
20(G)
20(B)
30
10

INK COMPOSITION, LIGHT-BLOCKING MEMBER AND IMAGE DISPLAY DEVICE

BACKGROUND

The present disclosure relates to an ink composition, a light-shielding member and an image display apparatus.

In recent years, image display apparatuses capable of displaying clearer images have been developed. For example, Patent Document 1 discloses a display module having plural LED chips mounted on a substrate. Also, Patent Document 1 discloses a configuration in which a light-reflective wall is provided between LED chips in order to prevent interference of output light between the LED chips (see Patent Document 1; [0043], FIG. 4, etc.).

In this connection, Patent Document 2 discloses a resin composition capable of forming a light-shielding partition wall. By the resin composition disclosed in Patent Document 2, a thick film partition wall having both of a tackless property after prebake and heat resistance after cure can be formed.

In addition, Patent Document 3 discloses a curable composition, which is suitable for application in an inkjet method and has suppressed glossiness as a black matrix used for LED products.

Patent Document

[Patent Document 1] JP2018-026517A
[Patent Document 2] JP2021-161401A
[Patent Document 3] WO2021/049331

SUMMARY

By the way, in order to use an image display apparatus for a long period of time, a light-shielding material such as the light-reflective wall described above is necessary to have sufficient substrate adhesion. The light-shielding material is also considered be able to be formed of an ink composition having a photocuring property, but materials formed of conventional ink compositions have not satisfied such substrate adhesion.

In addition, since ink compositions for forming light-shielding materials usually have a light-shielding property by themselves, curing of such ink compositions with light is hard to proceed.

In the light of the above-described problems, the present disclosure provides an ink composition and the like that can supply a cured product with excellent balance between the substrate adhesion and the light-shielding property, while maintaining the curability as an ink composition.

According to one aspect of the present disclosure, an ink composition is provided. This ink composition contains a light-shielding agent (A); a cationic polymerizable compound (B); a photoacid generator (C); and a sensitizer (D). Volume concentration of the light-shielding agent (A) with respect to total volume of a solid content of the ink composition is 0.3% or more and 12% or less. The cationic polymerizable compound (B) contains a metallic element-containing compound (B1) that includes a cationic polymerizable group and a hydrolyzable group. A content of the metallic element-containing compound (B1) is 5 parts by mass or more and 80 parts by mass or less, where entirety of the solid content of the ink composition is 100 parts by mass. The sensitizer (D) contains a compound (D1) having an anthracene skeleton.

The above-described aspect can provide the ink composition and the like that can supply a cured product with excellent balance between the substrate adhesion and the light-shielding property, while maintaining the curability as an ink composition.

BRIEF DESCRIPTION OF DRAWINGS

FIG. 1 is a cross-sectional view of an image display apparatus in which a cured product of an ink composition according to the present embodiment is applied as a light-shielding member.

DETAILED DESCRIPTION

Hereinafter, an embodiment of the present disclosure will be described. Incidentally, various features shown below in the embodiment can be combined with each other. In addition, numerical ranges expressed as “m to n” (m and n are numerals) in the present specification means “m or more and n or less (inclusively)”, unless otherwise specified.

Ink Composition

The ink composition of the present embodiment will be shown as follows.

An ink composition, comprising:

- a light-shielding agent (A); a cationic polymerizable compound (B); a photoacid generator (C); and a sensitizer (D), wherein
- volume concentration of the light-shielding agent (A) with respect to total volume of a solid content of the ink composition is 0.3% or more and 12% or less,
- the cationic polymerizable compound (B) contains a metallic element-containing compound (B1) that includes a cationic polymerizable group and a hydrolyzable group,
- a content of the metallic element-containing compound (B1) is 5 parts by mass or more and 80 parts by mass or less, where entirety of the solid content of the ink composition is 100 parts by mass, and
- the sensitizer (D) contains a compound (D1) having an anthracene skeleton.

Hereinafter, the components that constitute the ink composition of the present embodiment, a method for manufacturing the ink composition and applications thereof will be described.

[Light-Shielding Agent (A)]

The ink composition of the present embodiment contains a light-shielding agent (A). As described below, the ink composition of the present embodiment is typically used for forming a light-shielding member, and such inclusion of the light-shielding agent (A) by the ink composition contributes to improving the light-shielding property of the light-shielding member.

The light-shielding agent (A) may be selected from known materials, but preferably contains carbon black (A1) due to its good balance between the availability and the light-shielding property.

Besides, as the light-shielding agent (A), an other light-shielding agent (A2) than the above-described carbon black (A1) may be contained. Examples of the other light-shielding agent (A2) include: black titanium oxide; iron oxide black; inorganic light-shielding agents (A2-1) such as light-shielding agents that contain one or more kinds of metallic elements including vanadium, silver, copper and tin; organic black pigments (A2-2) such as aniline black, perylene black and lactam black; and black dyes (A2-3) such as azo compounds and azine compounds. Further, the other light-shielding agent (A2) may include: chromatic color pigments (A2-4) such as red pigments, blue pigments, green pigments and yellow pigments; and chromatic color dyes (A2-5) such as red dyes, blue dyes, green dyes and yellow dyes, in combination.

Moreover, the other light-shielding agent (A2) may be used alone or in combination, as far as the light-shielding function of the cured product to be obtained can be secured.

In the ink composition of the present embodiment, the volume concentration of the light-shielding agent (A) with respect to the total volume of the solid content of the ink composition is set within the range of 0.3% or more and 12% or less. By setting the volume concentration of the light-shielding agent (A) within the above range, the light-shielding property of the light-shielding member to be obtained can be high, while the curability of the ink composition is secured.

Herein, this volume concentration is a ratio of volume of the light-shielding agent (A) contained in the total volume of the solid content of the ink composition.

A method for obtaining this volume concentration of the light-shielding agent (A) can be set as appropriate, but the volume concentration can be obtained typically as follows.

That is, as long as volume of total components excluding the light-shielding agent (A) in the ink composition can be measured, the volume concentration of the light-shielding agent (A) can be obtained by a following formula (X1).

$$\text{(Volume concentration of Light-shielding agent } (A)) = \text{(Volume of Light-shielding agent } (A))/\{\text{(Volume of Light-shielding agent } (A)) + \text{(Volume of Total components excluding Light-shielding agent } (A))\} \quad \text{(X1)}$$

Incidentally, the volume of the light-shielding agent (A) can be obtained by a following formula (X2).

$$\text{(Volume of Light-shielding agent } (A)) = \text{(Weight of Light-shielding agent } (A))/\text{(True density of Light-shielding agent } (A)) \quad \text{(X2)}$$

Similarly, the volume of the total components excluding the light-shielding agent (A) can be obtained by a following formula (X3).

$$\text{(Volume of Total components excluding Light-shielding agent } (A)) = \text{(Weight of Total components excluding Light-shielding agent } (A))/\text{(True density of Total components excluding Light-shielding agent } (A)) \quad \text{(X3)}$$

That is, if formulation of the ink composition is known, the volume concentration of the light-shielding agent (A) can be calculated as described above, according to the kinds and blending amounts of the components to be blended. On the other hand, even if details of the formulation of the ink composition are unknown, the respective volume and the like of the light-shielding agent (A) and the other components can be obtained by separating the both components, whereby the above-described volume concentration can be obtained.

Incidentally, the volume concentration of the light-shielding agent (A) with respect to the total volume of the solid content of the ink composition is preferably 0.5% or more, more preferably 1% or more, and further preferably 1.5% or more. By setting within the above range, the light-shielding property of the light-shielding member can be further improved. Further, the volume concentration of the light-shielding agent (A) with respect to the total volume of the solid content of the ink composition is preferably 10% or less, more preferably 9% or less, and further preferably 8% or less. By setting within the above range, the curability of the ink composition can be further improved.

In the present embodiment, the content of the light-shielding agent (A) is preferably 0.6 parts by mass or more and 18 parts by mass or less, where the entirety of the solid content of the ink composition is 100 parts by mass. In another aspect, in the ink composition of the present embodiment, the content of the light-shielding agent (A) is preferably 3 parts by mass or more and 14 parts by mass or less, where the entirety of the solid content of the ink composition is 100 parts by mass. By setting the content of the light-shielding agent (A) within the above range, the light-shielding property of the light-shielding member to be obtained can be high, while the curability of the ink composition is secured.

Incidentally, the content of the light-shielding agent (A) is preferably 5 parts by mass or more, and more preferably 7 parts by mass or more, where the entirety of the solid content of the ink composition is 100 parts by mass. By setting within the above range, the light-shielding property of the light-shielding member can be further improved. Moreover, the content of the light-shielding agent (A) is preferably 13 parts by mass or less, and more preferably 11 parts by mass or less, where the entirety of the solid content of the ink composition is 100 parts by mass. By setting within the range, the curability of the ink composition can be further improved. In addition, in order to improve the curability of the ink composition, the content of the light-shielding agent (A) can be 8 parts by mass or less or 5 parts by mass or less, with respect to 100 parts by mass of the entirety of the solid content of the ink composition.

In another aspect, the content of the light-shielding agent (A) can be 0.8 parts by mass or more, 1 part by mass or more, or 1.2 parts by mass or more, where the entirety of the solid content of the ink composition is 100 parts by mass.

Incidentally, a mass ratio of the carbon black (A1) with respect to entirety of the light-shielding agent (A) is preferably 80% by mass or more, more preferably 90% by mass or more, further preferably 95% by mass or more, and particularly preferably 98% by mass or more. Also, the light-shielding agent (A) may be constituted substantially solely of the carbon black (A1). Thereby, the above-described effect is more likely to be exhibited.

Further, the light-shielding agent (A) may include the other light-shielding agent (A2) than the carbon black (A1). A blending ratio of the other light-shielding agent (A2) is arbitrarily. As an example, a mode in which the light-shielding agent (A) is constituted substantially solely of an inorganic light-shielding agent that contains one or more kinds of metallic elements such as black titanium oxide, iron oxide black, vanadium, silver, copper and tin can also be exemplified.

[Cationic Polymerizable Compound (B)]

The ink composition of the present embodiment contains the cationic polymerizable compound (B). This cationic polymerizable compound (B) is a compound containing a cationic polymerizable group in its chemical structure. Specifically, examples of this cationic polymerizable group include: cyclic ether groups such as epoxy groups and oxetanyl groups; vinyl ether groups; and the like. Further, as the cationic polymerizable compound (B) of the present embodiment, in addition to epoxy compounds and toxetane compounds, oxolane compounds (such as tetrahydrofuran and substituted tetrahydrofuran) and other compounds are included.

The ink composition of the present embodiment contains, as this cationic polymerizable compound (B), a metallic element-containing compound (B1) that includes a cationic polymerizable group and a hydrolyzable group. Moreover, the ink composition of the present embodiment may further contain an other cationic polymerizable compound (B2) that does not correspond to this metallic element-containing compound (B1). Explanations for these components will be continued as follows.

The metallic element-containing compound (B1) in the present embodiment contains the above-described cationic polymerization group and a metallic element in its chemical structure. Specifically, this metallic element-containing compound (B1) can be represented by a following structural formula (1).

$$M(R)x(X)y \qquad (1)$$

Here, M in the structural formula (1) is a metallic element, R is an organic group including a cationic polymerizable group in its structure, and a carbon atom included in R and M are bonded. X is a group selected from the group consisting of: a hydrogen atom; a halogen atom; a hydroxyl group; alkoxy group; and a phenoxy group. The codes of x and y are integers of 1 or more, and a sum of x and y is the number of atomic bonding hands of M.

As the above-described metallic element, silicon, aluminum, titanium, zirconium, tin, lead, boron and the like can be exemplified. Among them, the metallic element is preferably silicon in the light of its availability and handleability, that is, the metallic element-containing compound (B1) is preferably a silicon-containing compound. Further, as described above, the metallic element-containing compound (B1) contains a cationic polymerizable group in the structure of R. Regarding this point, in the light of high reactivity and the like, an epoxy group is preferably contained in the structure of R, that is, the cationic polymerizable group included in the metallic element-containing compound (B1) is preferably an epoxy group. Also, the cationic polymerizable group included in the structure of R may be an oxetanyl group. In addition, if X is an alkoxy group, a carbon number of the alkoxy group is, for example, 1 to 8, preferably 1 to 6, and more preferably 1 to 4. If X is a phenoxy group, hydrogen atoms of a benzene ring that composes this phenoxy group may be substituted with various substituents.

Incidentally, if M is silicon, an aspect in which x is 1 or 2, and y is 2 or 3 can be exemplified.

While the metallic element-containing compound (B1) of the present embodiment is cationically polymerized by acid generated by the photoacid generator (C) described below, the metallic element included in the structure of the metallic element-containing compound (B1) can form a chemical bond with a surface site of the substrate to which the ink composition is applied. Also by the above-described contribution, the ink composition of the present embodiment can exhibit high substrate adhesion.

Examples of particularly preferable compounds as this metallic element-containing compound (B1) include: 3-glycidoxypropyltrimethoxysilane; 3-glycidoxypropyltriethoxysilane; 3-glycidoxypropylmethyldimethoxysilane; 2-(3,4-epoxycyclohexyl)ethyltrimethoxysilane; 2-(3,4-epoxycyclohexyl)ethyltriethoxysilane; 3-[(3-ethyloxetan-3-yl)methoxy]propyl(trimethoxy)silane; 3-[(3-ethyloxetan-3-yl)methoxy]propyl(triethoxy)silane; 3-[(3-methyloxetan-3-yl)methoxy]propyl(trimethoxy)silane; 3-[(3-methyloxetan-3-yl)methoxy]propyl(trimethoxy)silane; and the like.

As the other cationic polymerizable compound (B2) that can be included by the ink composition of the present embodiment, an epoxy compound, an oxetane compound, a vinylether compound and the like are preferable due to their high availability and reactivity. Incidentally, the other cationic polymerizable compound does not contain the above-described metallic element in its chemical structure.

The epoxy compound is a compound having an epoxy group, and examples thereof include glycidylether-type epoxy compounds, alicyclic epoxy compounds and the like.

Incidentally, the number of epoxy groups included in the epoxy compound may be one or more, and an epoxy compound having two or more epoxy groups may also be included. That is, the epoxy compound included in the other cationic polymerizable compound (B2) of the present embodiment may be either a monofunctional epoxy compound or a polyfunctional epoxy compound.

Specific examples of the epoxy compound include: phenylglycidylether, 2-ethylhexylglycidylether; 3,3-bis[(2-oxiranylmethoxy)methyl]oxetane; 3',4'-epoxycyclohexylmethyl-3,4-epoxycyclohexanecarboxylate; 3,4,3',4'-diepoxybicyclohexyl; 1,2-epoxy 4-vinylcyclohexane; ε-caprolactone-modified 3',4'-epoxycyclohexylmethyl; 3,4-epoxycyclohexanecarboxylate; limonenedioxide; 2,2-bis(4-glycidyloxyphenyl)propane; mixtures of 2-[4-(2,3-epoxypropoxy)phenyl]-2-[4-[1,1-bis[4([2,3-epoxypropoxy]phenyl)]ethyl]phenyl]propane and 1,3-bis[4-[1-[4-(2,3-epoxypropoxy)phenyl]-1-[4-[1-[4-(2,3-epoxypropoxy)phenyl]-1-methylethyl]phenyl]ethyl]phenoxy]-2-propanol; 2-[4-(2,3-epoxypropoxy)phenyl]-2-[4-[1,1-bis[4([2,3-epoxypropoxy]phenyl)]ethyl]phenyl]propane; and the like.

Further, as the epoxy compound, either of epoxy monomers, epoxy oligomers and epoxy resins may be used, and below-described commercial products may be used.

That is, multifunctional epoxy monomers such as CELLOXIDE (registered trademark) CEL2021P, CEL2000 and CEL8000 (produced by Daicel Corporation) may also be used as the epoxy compound.

Also, glycidylether-type epoxy resins such as TECHMORE VG3101L (produced by Printec Corporation), EPPN-501H and 502H (produced by Nippon Kayaku Co., Ltd.) and jER 1032H60 (produced by Mitsubishi Chemical Corporation); bisphenol A novolac-type epoxy resins such as jER 157S65 and 157S70 (produced by Mitsubishi Chemical Corporation); phenol novolac-type epoxy resins such as EPPN-201 (produced by Nippon Kayaku Co., Ltd.) and jER 152 and 154 (produced by Mitsubishi Chemical Corporation); and other resins can be used as the epoxy compound of the present embodiment.

The number of oxetanyl groups included in the oxetane compound may be one or more, and an oxetane compound having two or more oxetanyl groups may be included. That is, the oxetane compound included in the other cationic polymerizable compound (B2) of the present embodiment may be either a monofunctional oxetane compound or a polyfunctional oxetane compound.

Examples of the oxetane compound include: 2-ethylhexyloxetane; 3-ethyl-3-ethoxymethyloxetane; 3-ethyl-3-butoxymethyloxetane; 3-ethyl-3-hexyloxymethyloxetane; 3-ethyl-3-(2-ethylhexyloxymethyl)oxetane; [(1-ethyl-3-oxetanyl)methoxy]cyclohexane; 3-ethyl-3-(phenoxymethyl) oxetane; 3-ethyl-3-methoxymethyloxetane; oxetane alcohol; 3-ethyl-3{[3-ethyloxetan-3-yl]methoxy}methyl)oxetane; bis[(1-ethyl-3-oxetanyl)methoxy]cyclohexane; bis[(1-ethyl-3-oxetanyl)methoxy]norbornane; 1,4-bis((1-ethyl-3-oxetanyl)methoxy)benzene; 1,3-bis((1-ethyl-3-oxetanyl) methoxy)benzene; 4,4'-bis((3-ethyl-3-oxetanyl)methoxy) biphenyl; xylenebisoxetane; and the like.

Examples of the vinylether compound include divinylether or trivinylether compounds such as: ethyleneglycoldivinylether; diethyleneglycoldivinylether; triethyleneglycoldivinylether; propyleneglycoldivinylether; dipropyleneglycoldivinylether; butanedioldivinylether; hexanedioldivinylether; cyclohexanedimethanoldivinylether; and trimethylolpropanetrivinylether, and monovinylether compounds such as ethylvinylether; n-butylvinylether; cyclohexylvinylether; isobutylvinylether; octadecylvinylether; 2-ethylhexylvinylether; hydroxybutylvinylether; cyclohexanedimethanolmonovinylether; n-propylvinylether; isopropylvinylether; isopropenylether-o-propylenecarbonate; dodecylvinylether; diethyleneglycolmonovinylether; and octadecylvinylether.

In the case where the ink composition of the present embodiment contains the other cationic polymerizable compound (B2), this other cationic polymerizable compound (B2) preferably contains a compound that includes one cationic polymerizable group in its chemical structure.

Typically, the ink composition of the present embodiment preferably contains a monofunctional epoxy compound or a monofunctional oxetane compound. These compounds are less likely to cause curing shrinkage during curing, thereby consequently contributing to substrate adhesion of a cured film.

As an example, a content of the monofunctional epoxy compound or the monofunctional oxetane compound may be 5 parts by mass or more, 20 parts by mass or more, or 40 parts by mass or more, where entirety of the other cationic polymerizable compound (B2) is 100 parts by mass. An upper limit of the content is not particularly limited, and all of the other cationic polymerizable compound (B2) may be the monofunctional epoxy compound or the monofunctional oxetane compound, and the content of the monofunctional epoxy compound or the monofunctional oxetane compound may be adjusted to be 85 parts by mass or less, where the entirety of the other cationic polymerizable compound (B2) is 100 parts by mass.

Further, in the case where the ink composition of the present embodiment contains the other cationic polymerizable compound (B2), this other cationic polymerizable compound (B2) contains two or more kinds of components. By adopting such constituents, the ink composition with excellent curability and balance of the adhesion and the hardness of the cured film can be realized easily.

In the ink composition of the present embodiment, the content of the cationic polymerizable compound (B) is preferably 5 parts by mass or more and 96 parts by mass or less, more preferably 7 parts by mass or more and 95 parts by mass or less, and further preferably 10 parts by mass or more and 94 parts by mass or less, where the entirety of the solid content of the ink composition is 100 parts by mass. By setting the content of the cationic polymerizable compound (B) within the above range, the curability of the ink composition can be high, while storage stability of the ink composition is secured.

In the ink composition of the present embodiment, the content of the metallic element-containing compound (B1) is 5 parts by mass or more and 80 parts by mass or less, where the entirety of the solid content of the ink composition is 100 parts by mass. By setting the content of the metallic element-containing compound (B1) within the above range, the substrate adhesion can be higher than that in the prior art. Further, the content of the metallic element-containing compound (B1) is more preferably 8 parts by mass or more and 78 parts by mass or less, and further preferably 10 parts by mass or more and 78 parts by mass or less, where the entirety of the solid content of the ink composition is 100 parts by mass. By setting the content of the metallic element-containing compound (B1) within the above range, the substrate adhesion can be higher. Incidentally, in the light of the reduction in production costs, the content of the metallic element-containing compound (B1) may also be set to 70 parts by mass or less, 60 parts by mass or less, or 55 parts by mass or less, where the entirety of the solid content of the ink composition is 100 parts by mass.

In the ink composition of the present embodiment, a content of the other cationic polymerizable compound (B2) is preferably 5 parts by mass or more and 80 parts by mass or less, more preferably 10 parts by mass or more and 78 parts by mass or less, further preferably 15 parts by mass or more and 75 parts by mass or less, where the entirety of the solid content of the ink composition is 100 parts by mass. By setting the content of the other cationic polymerizable compound (B2) within the above range, favorable curability can be exhibited, and film quality of the shielding member to be obtained can be favorable.

[Photoacid Generator (C)]

The ink composition of the present embodiment contains the photoacid generator (C). That is, when the ink composition of the present embodiment is exposed to light, the photoacid generator (C) generates acid so as to promote the above-described polymerization reaction of the cationic polymerizable compound (B).

This photoacid generator (C) may be selected from known materials, but preferably contains a sulfonium salt compound (C1). By the use of the sulfonium salt compound (C1) as described above, the curing of the ink composition by light proceeds efficiently.

This sulfonium salt compound (C1) is a salt of a sulfonium cation and an anion.

Herein, examples of the sulfonium cation include: triphenylsulfonium; (4-tert-butoxyphenyl)diphenylsulfonium; bis(4-tert-butoxyphenyl)phenylsulfonium; tris(4-tert-butoxyphenyl)sulfonium; (3-tert-butoxyphenyl)diphenylsulfonium; bis(3-tert-butoxyphenyl)phenylsulfonium; tris(3-tert-butoxyphenyl)sulfonium; (3,4-di-tert-butoxyphenyl) diphenylsulfonium; bis(3,4-di-tert-butoxyphenyl) phenylsulfonium; tris(3,4-di-tert-butoxyphenyl)sulfonium; diphenyl(4-(phenylthio)phenyl)sulfonium; (4-tert-butoxycarbonylmethyloxyphenyl)diphenylsulfonium; tris(4-tert-butoxycarbonylmethyloxyphenyl)sulfonium; (4-tert-butoxyphenyl)bis(4-dimethylaminophenyl)sulfonium; tris(4-dimethylaminophenyl)sulfonium; 2-naphthyldiphenylsulfonium; 4-dimethyl-2-naphthylsulfonium; hydroxyphenyldimethylsulfonium; 4-methoxyphenyldimethylsulfonium; 2-oxocyclohexylcyclohexylmethylsulfonium; trimethylsulfonium; trinaphthylsulfonium; tribenzylsulfonium; and the like.

Further, as the anion, anions such as: $BF_4^-$; $PF_6^-$; $SbF_6^-$; $[BX_4]^-$ (X denotes a phenyl group substituted with at least two or more fluorine atoms or trifluoromethyl groups); $[PF_nY_{6-n}]^-$ (Y denotes a 1-9C fluorinated alkyl group or a 1-9C fluorinated phenyl group, and n denotes an integer from 1 to 6); and sulfonate can be exemplified.

As the compounds (also referred to as an "other photoacid generator (C2)") that can be used as the photoacid generator (C), ionic photoacid generators except sulfonium salts, non-ionic photoacid generators and the like can be exemplified.

Specifically, as the other photoacid generator (C2), phenyldiazonium salts of boron tetrafluoride; diphenyliodonium salts of phosphorus hexafluoride; diphenyliodonium salts of antimony hexafluoride; diphenyliodonium salts of tetrakis (pentafluorophenyl)boron; mixtures of an acetylacetone aluminum salt and ortho-nitrobenzylsilylether; phenylthiopyridium salts; phosphorus hexafluoride allene-iron complexes; sulfonyldiazomethane; N-sulfonyloxyimide-type photoacid generators such as phthalic imide-type photoacid generators and naphthalimide-type photoacid generators; oxime-O-sulfonate-type photoacid generators; and the like can be exemplified.

In the ink composition of the present embodiment, the photoacid generator (C) preferably contains a compound having a peak wavelength of 280 nm or more. By using such a compound, the light-shielding member can be formed easily with industrial advantage. Incidentally, the compound having the peak wavelength of 280 nm or more may be either the compounds that correspond to the sulfonium salt compound (C1) or the compounds that corresponds to the other photoacid generator (C2).

In the ink composition of the present embodiment, a content of the photoacid generator (C) is preferably 0.1 parts by mass or more and 15 parts by mass or less, more preferably 0.5 parts by mass or more and 10 parts by mass or less, and further preferably 1 parts by mass or more and 8 parts by mass or less, where the entirety of the solid content of the ink composition is 100 parts by mass. By setting the content of the photoacid generator (C) within the above range, the curability of the ink composition can be high, while the storage stability of the ink composition is secured.

Incidentally, a mass ratio of the sulfonium salt compound (C1) with respect to entirety of the photoacid generator (C) is preferably 80% by mass or more, more preferably 90% by mass or more, further preferably 95% by mass or more, and particularly preferably 98% by mass or more. Also, the photoacid generator (C) may be constituted substantially only of the sulfonium salt compound (C1). Thereby, the above-described effect is more likely to be exhibited.

[Sensitizer (D)]

The ink composition of the present embodiment contains the sensitizer (D). That is, by containing the sensitizer (D) as described above, the ink composition of the present embodiment can secure the favorable curability, in spite of the inclusion of the light-shielding agent (A).

Incidentally, in the present embodiment, the sensitizer (D) contains a compound (D1) that includes an anthracene skeleton. The present inventors have found that, by containing the compound (D1) that includes the anthracene skeleton among various kinds of the sensitizer (D) in the ink composition, the ink composition can secure the favorable curability, in spite of the inclusion of the light-shielding agent (A).

As the compound (D1) including the anthracene skeleton, anthracene; 9-anthracenemethanol; 9-anthracenecarboxylic acid; 9,10-diphenylanthracene; 9,10-bis(phenylethynyl)anthracene; 2-methoxyanthracene; 1,5-dimethoxyanthracene; 1,8-dimethoxyanthracene; 9,10-diethoxyanthracene; 9,10-dibutoxyanthracene; 9,10-bis(octanoyloxy)anthracene; 6-chloroanthracene; 1,5-dichloroanthracene; and the like can be exemplified.

They may be used alone or in combination of two kinds or more.

Further, the ink composition of the present embodiment may also contain an other sensitizer (D2) that do not correspond to the above-described compound (D1) including the anthracene skeleton.

As the other sensitizer (D2), aromatic nitro compounds; coumarins; thiazolines; oxazolines; thioxanthones; benzothiazole; nitroaniline; nitroacenaphthene; benzoinalkylether; N-alkylated phthalone; naphthalenes; chrysene; pyrene; benzopyran; azoindolizine; furocoumarin; phenothiazine; benzo[c]phenothiazine; 7-H-benzo[c]phenothiazine; triphenylene; 1,3-dicyanobenzene; phenyl-3-cyanobenzoate; and the like can be exemplified.

In the ink composition of the present embodiment, a content of the sensitizer (D) is preferably 0.05 parts by mass or more and 6 parts by mass or less, more preferably 0.08 parts by mass or more and 4 parts by mass or less, and further preferably 0.1 parts by mass or more and 2 parts by mass or less, where the entirety of the solid content of the ink composition is 100 parts by mass. By setting the content of the sensitizer (D) within the above range, the curability of the ink composition can be high, while the storage stability of the ink composition is secured.

Incidentally, a mass ratio of the compound (D1) including the anthracene skeleton with respect to entirety of the sensitizer (D) is preferably 80% by mass or more, more preferably 90% by mass or more, further preferably 95% by mass or more, and particularly preferably 98% by mass or more. Also, the sensitizer (D) may be constituted substantially only of the compound (D1) including the anthracene skeleton. Thereby, the above-described effect is more likely to be exhibited.

[Solvent (S)]

The ink composition of the present embodiment may contain a solvent (S) as a volatile component. By including the solvent (S) as described above, the ink composition of the present embodiment is likely to have an excellent coating property. As this solvent (S), one or more kinds of solvents known in the field of the ink can be used. Incidentally, as an organic solvent, for example, one or more kinds of: alcohol solvents; ketone solvents; ester solvents; ether solvents; etherester solvents; glycolether solvents; amide solvents; carbonate solvents; and the like can be used.

Examples of the alcohol solvents include: methanol; ethanol; isopropanol; 1-butanol; tertiary butanol; isobutanol; diacetone alcohol; 3-methoxy-3-methyl-1-butanol; and the like.

Examples of the ketone solvents include: acetone; methylethylketone; diethylketone; methylisobutylketone; cyclopentanone; cyclohexanone; diisobutylketone; and the like.

Examples of the ester solvents include: ethylacetate; methylacetate; butylacetate; methoxybutylacetate; cellosolveacetate; amylacetate; normalpropylacetate; isopropylacetate; methyllactate; ethyllactate; butyllactate; and the like.

Examples of the ether solvents include: dibutylether; tetrahydrofuran; dioxane; and the like.

Examples the etherester solvents include: 2-ethoxyethylacetate; propyleneglycolmonomethyletheracetate; diethyleneglycolmonoethyletheracetate; ethyldiglycolacetate; methylmethoxypropionate; and the like.

Examples of the glycolether solvents include: ethyleneglycolmonomethylether; diethyleneglycolmonomethylether; diethyleneglycolmonoethylether; diethyleneglycoldiethylether; diethyleneglycoldibutylether; propyleneglycolmonomethylether; butylcellosolve (ethyleneglycolmonobutylether); and the like.

Examples of the amide solvents include: N-methylpyrrolidone; N,N-dimethylformamide; and the like.

Examples of the carbonate solvents include: propylenecarbonate; ethylenecarbonate; dimethylcarbonate; diethylcarbonate; methylethylcarbonate; and the like.

In the case where the ink composition of the present embodiment contains the solvent (S), a content thereof is arbitrary. For example, the content of the solvent (S) may be set so that the concentration of the solid content of the ink composition may be within a range from 60% by mass to 100% by mass.

Incidentally, the ink composition of the present embodiment can also have an aspect of not substantially containing the above-described solvent (S). Incidentally, in the present specification, "not substantially contain" is used for the purpose of excluding an aspect of intentionally adding a predetermined component, and aims to accept an aspect in which blending of the predetermined component is inevitable in manufacturing processes. In an exemplary process, this solvent (S) is required to be heated to be removed in a step previous to the exposure of the ink composition of the present embodiment to light. The case where the ink composition does not substantially contain the solvent (S) is favorable, because the above-described heating process can be omitted.

[Other Additive]

The ink composition of the present embodiment may contain an additional component other than the above-described respective components. This additional component includes a surface conditioner, and as this surface conditioner, silicone compounds; wax; antifoaming agents; leveling agents; foaming preventing agents (components for breaking air bubbles involved during coating); and the like can be used.

Examples of the surface conditioner include: Acronal (registered trademark) series (produced by BASF, (meth) acrylic resins) such as Acronal 4F; BYK series (produced by BYK Chemie GmbH); Polyflow series (produced by KYOEISHA CHEMICAL Co., LTD.); Resiflow series (produced by Estron Chemical, Inc.); MODAFLOW series (produced by Monsanto Company); and the like.

The ink composition of the present embodiment may contain only one kind or plural kinds of the surface conditioners. Further, an amount of the surface conditioner in the ink composition of the present embodiment is not particularly limited, and may be adjusted as appropriate according to the combination with other performances.

The ink composition of the present embodiment may also contain: a filler; a coupling agent; an antioxidant; a viscosity modifier; a preservative stabilizer; a dispersant; or the like as the other additive. An amount of these agents in the ink composition of the present embodiment is not particularly limited, and can be adjusted as appropriate according to the combination of the other performances.

[Method for Manufacturing Ink Composition]

The ink composition of the present embodiment is typically prepared by mixing the above-described components.

More specifically, the ink composition of the present embodiment can be manufactured by following procedures. (Step 1): By dispersing the light-shielding agent (A) into a dispersion medium, the dispersion medium that contains the light-shielding agent (A) is obtained. (Step 2): The thus obtained dispersion liquid is mixed with other materials.

That is, in the above-described method, the dispersion liquid containing the light-shielding agent (A) is once obtained in (Step 1), and is mixed with the other materials so as to obtain the objective ink composition.

Incidentally, as the dispersion medium used for obtaining the dispersion liquid, various materials that can disperse the light-shielding agent (A) may be used. For example, if the cationic polymerizable compound (B) is in a liquid state, this cationic polymerizable compound (B) can be used also as the dispersion medium. In addition, in order to improve dispersibility of the dispersion liquid, a dispersant (also referred to as an "anti-settling additive" or a "dispersant auxiliary agent") may be added to the dispersion liquid.

As the dispersant, known dispersants can be adopted, and polymer-type dispersants can be exemplified typically. As the dispersant, commercially available products can be used, and specific examples thereof include: FLOWLEN DOPA series (produced by KYOEISHA CHEMICAL Co., LTD.); Solspace series (produced by Lubrizol Japan Ltd.); AJISPER series (produced by Ajinomoto Fine-Techno Co., Inc.); DISPERBYK series (produced by BYK-Chemie GmbH); DISPARLON series (produced by Kusumoto Chemicals, Ltd.); and the like.

A blending ratio of the dispersant in the dispersion liquid can be set as appropriate according to its kind and the like, and, for example, ranges from 10 parts by mass to 100 parts by mass, and preferably ranges from 20 parts by mass to 70 parts by mass, with respect to 100 parts by mass of the light-shielding agent (A).

Subsequently, the dispersion liquid obtained in (Step 1) is mixed with other materials in (Step 2). In this (Step 2), a mixing method is not limited particularly.

Thereby, the objective ink composition can be obtained.

[Application]

The ink composition of the present embodiment is used, for example, to form a light-shielding member that is provided in an image display apparatus. Examples of this image display apparatus include a liquid crystal display provided with backlights and liquid crystal cells, a display apparatus provided with: light emitting devices such as OLED (Organic Light Emitting Diode) elements; mini LED (mini Light Emitting Diode) elements; micro LED (micro Light Emitting Diode) elements; and quantum dots, and the like.

The ink composition of the present embodiment is cured by being exposed to light so as to become a cured film, which can function as a light-shielding member in an image display apparatus. Typically, this light-shielding member is provided in a display area in which images are displayed in an image display apparatus. Herein, the above-mentioned display area refers to an area defined by connecting: a pixel that can be recognized by a person who faces this image display apparatus; and a viewpoint of the person who faces this image display apparatus. That is, although a so-called marginal frame of the display is excluded, a black matrix that separates RGB patterns of a color filter that is provided in the above-described liquid crystal display is present in this display area.

Also, in the case where an image display apparatus has plural types of light emitting devices, the light-shielding member formed of the ink composition of the present embodiment may be provided between these plural types of the light emitting devices. In this case, when the light emitting devices 20 emit light, the light-shielding members exhibits a function to mitigate light interference between the adjacent light emitting devices.

An example of the image display apparatus provided with such a light-shielding member will be described with reference to the drawings.

FIG. 1 is a cross-sectional view of an image display apparatus in which a cured product of the ink composition of the present embodiment is applied as a light-shielding member. The image display apparatus 100 in FIG. 1 is provided with: a substrate 10; light emitting devices 20; and light-shielding members 30. The substrates 10 of this image display apparatus 100 is constituted of a material selected from various materials, and may be constituted of an inorganic or organic material. As a typical example, this substrate 10 is a glass substrate, but may also be a substrate constituted of a composite material that is a composite of glass fiber and an epoxy resin or other ceramics. Incidentally, a circuit and electrodes are typically provided on the substrate 10, and are structured so that a current can be applied to the light emitting devices 20, which are not illustrated in the FIGURE.

Incidentally, this circuit or electrodes may be made of copper, indium tin oxide or the like.

The light emitting device 20 is typically a mini LED or a micro LED, in which a light emitting device 20(R), a light emitting device 20(G) and a light emitting device 20(B) emit red, green and blue light, respectively. Incidentally, the light emitting devices 20 provided in the image display apparatus 100 of the present embodiment may also be OLEDs.

The light-shielding members 30 are formed by curing the ink composition of the present embodiment, and are provided between the plural light emitting devices 20. As described above, when the light emitting devices 20 emit light, the light-shielding members 30 exhibit the function to mitigate the light interference between the adjacent light emitting devices 20. Incidentally, the light-shielding members 30 of the present embodiment are formed of a specific ink composition, and thus have excellent adhesion with the substrate 10, thereby exhibiting such a function stably over a long term use.

This light-shielding members 30 can be obtained by: applying the ink composition to be arranged between the light emitting devices 20 onto the substrate on which the light emitting devices 20 are mounted; and photocuring the ink composition. Such application is exemplarily performed using an inkjet printer (that is, it also means that the ink composition of the present embodiment is for inkjet printing). Incidentally, although FIG. 1 illustrates a structure in which the light-shielding members 30 are disposed in positions that are in contact with the light emitting devices 20, but this light-shielding members 30 may also be disposed to be separated from the light emitting devices 20. Further, heights (a thickness of the substrate 10 in a film thickness direction) of the light-shielding members 30 and the light emitting devices 20 may be different.

When obtaining the light-shielding member 30 from the ink composition of the present embodiment, in order to easily obtain uniform film quality in the film thickness direction, the thickness of the light-shielding members 30 may be 25 μm or less, or 20 μm or less, as an example.

Incidentally, for suppressing the interference between light emitted by the light emitting devices 20, the thickness of the light-shielding members 30 may also the above-described thickness or more. When forming the above-described light-shielding members 30, for example, a following method can be adopted.

That is, the light-shielding members 30 with a high thickness may also be formed by: adjusting the thickness of the ink composition to be curable by light exposure; photocuring the ink composition once; and forming a coating film of the ink composition further on the cured film (in other words, the light-shielding member 30 can also be formed by laminating the cured films of the ink composition).

Therefore, the light-shielding members 30 can be designed to have the thickness that is the above-described thickness or more, as necessary. As an example, the thickness of the light-shielding members 30 may be 300 μm or less, or 200 μm or less. Also, for improving the film quality of the light-shielding members 30, a heating process may be performed after laminating the cured films so as to increase a degree of crosslinkage of the film.

Further, for the purpose of enhancing the reliability and the like of the image display apparatus 100 to be obtained, hardness of the light-shielding member 30 may also be adjusted. Exemplarily, pencil hardness of the light-shielding members 30 may be H or more, 2H or more, 3H or more, or 4H or more.

In addition, the ink composition may also be provided in each of following aspects.

[α1]

An ink composition, comprising:

a light-shielding agent (A); a cationic polymerizable compound (B); a photoacid generator (C); and a sensitizer (D), wherein volume concentration of the light-shielding agent (A) with respect to total volume of a solid content of the ink composition is 0.3% or more and 12% or less, the cationic polymerizable compound (B) contains a metallic element-containing compound (B1) that includes a cationic polymerizable group and a hydrolyzable group, a content of the metallic element-containing compound (B1) is 5 parts by mass or more and 80 parts by mass or less, where entirety of the solid content of the ink composition is 100 parts by mass, and the sensitizer (D) contains a compound (D1) having an anthracene skeleton.

[α2]

The ink composition according to [α1], wherein a content of the light-shielding agent (A) is 0.6 parts by mass or more and 18 parts by mass or less, where the entirety of the solid content of the ink composition is 100 parts by mass.

[α3]

The ink composition according to [α1] or [α2], wherein the light-shielding agent (A) contains carbon black (A1) or an inorganic light-shielding agent (A2-1).

[α4]

The ink composition according to any one of [α1] to [α3], wherein the metallic element-containing compound (B1) is a silicon-containing compound.

[α5]

The ink composition according to any one of [α1] to [α4], wherein the cationic polymerizable group included in the metallic element-containing compound (B1) is an epoxy group.

[α6]

The ink composition according to any one of [α1] to [α5], wherein the cationic polymerizable compound (B) further contains an other cationic polymerizable compound (B2) that does not correspond to the metallic element-containing compound (B1).

[α7]

The ink composition according to any one of [α1] to [α6], wherein the photoacid generator (C) contains a sulfonium salt compound (C1).

[α8]

The ink composition according to any one of claims [α1] to [α7], the ink composition being used for inkjet printing.

[α9]

The ink composition according to any one of [α1] to [α8], the ink composition being used for forming a light-shielding member that is provided in an image display apparatus.

[α10]

The ink composition according to [α9], wherein the light-shielding member is provided in a display area in which images are displayed in the image display apparatus.

[α11]

The ink composition according to [α10], wherein the image display apparatus includes plural kinds of light emitting devices, and the light-shielding member is provided between the plural kinds of the light emitting devices.

[α12]

A light-shielding member, which is manufactured by curing the ink composition according to any one of [α1] to [α11].

[α13]

An image display apparatus, which is configured to include the light-shielding member according to [α12].

[β1]

An ink composition, comprising:

a light-shielding agent (A); a cationic polymerizable compound (B); a photoacid generator (C); and a sensitizer (D), wherein a content of the light-shielding agent (A) is 3 parts by mass or more and 14 parts by mass or less, where entirety of a solid content of the ink composition is 100 parts by mass, the cationic polymerizable compound (B) contains a metallic element-containing compound (B1) that includes a cationic polymerizable group and a hydrolyzable group, and the sensitizer (D) contains a compound (D1) having an anthracene skeleton.

[β2]

The ink composition according to [β1], wherein the light-shielding agent (A) contains carbon black (A1).

[β3]

The ink composition according to [β1] or [β2], wherein the metallic element-containing compound (B1) is a silicon-containing compound.

[β4]

The ink composition according to any one of [β1] to [β3], wherein the cationic polymerizable group included in the metallic element-containing compound (B1) is an epoxy group.

[5]

The ink composition according to any one of [β1] to [β4], wherein the cationic polymerizable compound (B) further contains an other cationic polymerizable compound (B2) that does not correspond to the metallic element-containing compound (B1).

[β6]

The ink composition according to any one of [β1] to [β5], wherein a content of the metallic element-containing compound (B1) is 3 parts by mass or more and 80 parts by mass or less, where the entirety of the solid content of the ink composition is 100 parts by mass.

[β7]

The ink composition according to any one of [β1] to [β6], wherein the photoacid generator (C) contains a sulfonium salt compound (C1).

[β8]

The ink composition according to any one of [β1] to [β7], the ink composition being used for inkjet printing.

[β9]

The ink composition according to any one of [β1] to [β8], the ink composition being used for forming a light-shielding member that is provided in an image display apparatus.

[β10]

The ink composition according to [β9], wherein the light-shielding member is provided in a display area in which images are displayed in the image display apparatus.

[β11]

The ink composition according to [β10], wherein the image display apparatus includes plural kinds of light emitting devices, and the light-shielding member is provided between the plural kinds of the light emitting devices.

[β12]

A light-shielding member, which is manufactured by curing the ink composition according to any one of [β10] to [β11].

[β13]

An image display apparatus, which is configured to include the light-shielding member according to [β12].

The above describes the embodiment of the present disclosure, but they are examples of the present disclosure, and various structures other than the above can be adopted. The present disclosure is not limited to the embodiment described above, and modification, improvement and the like within a range of achieving the aim of the present disclosure are included in the present disclosure.

EXAMPLE

Hereinafter, the present disclosure will be described further in detail by way of examples and comparative examples. Incidentally, the present disclosure is not limited by the following examples.

[Raw Materials Used]

Firstly, raw materials used in the present example will be described. The respective raw materials used in the present example are as follows.—A1-1: MITSUBISHI Carbon Black MA7 (produced by Mitsubishi Chemical Corporation)

A2-1: TilackD TM-A (black titanium oxide; produced by AKO KASEI CO., LTD.)

B1-1: KBM-403 (chemical name: 3-glycidoxypropyltrimethoxysilane; produced by Shin-Etsu Chemical Co., Ltd.)

B1-2: KBM-303 (chemical name: 2-(3,4-epoxycyclohexyl)ethyltrimethoxysilane; produced by Shin-Etsu Chemical Co., Ltd.)

B2-1: ARON OXETANE OXT-221 (chemical name: 3-ethyl-3{[3-ethyloxetan-3-yl]methoxy}methyl)oxetane; produced by TOAGOSEI CO., LTD.)

B2-2: CELLOXIDE 2021P (chemical name: 3',4'-epoxycyclohexylmethyl-3,4-epoxycyclohexanecarboxylate; produced by Daicel Corporation)

B2-3: limonenedioxide (produced by RENESSENZ, LLC.)

B2-4: 3,3-bis[(2-oxiranylmethoxy)methyl]oxetane

B2-5: DENACOL EX-141 (chemical name: phenylglycidylether; produced by Nagase ChemteX Corporation)

B2-6: DENACOL EX-121 (chemical name: 2-ethylhexylglycidylether; produced by Nagase ChemteX Corporation)

C1-1: CPI-110P (chemical name: diphenyl[4-(phenylthio) phenyl]sulfonium hexafluorophosphate; produced by San-Apro Ltd.)

C1-2: CPI-110B (chemical name: diphenyl[4-(phenylthio)phenyl]sulfonium tetrakis(pentafluorophenyl)borate; produced by San-Apro Ltd.)

D1-1: ANTHRACURE (registered trademark) UVS-1331 (chemical name: 9,10-dibutoxyanthracene; produced by AIR WATER PERFORMANCE CHEMICAL INC.)

D1-2: ANTHRACURE (registered trademark) UVS-581 (chemical name: 9,10-bis(octanoyloxy)anthracene; produced by AIR WATER PERFORMANCE CHEMICAL INC.)

D2-1: Omnirad DETX (chemical name: 2-methyl-[4-(methylthio)phenyl]-2-morpholino-1-propane; produced by IGM Resins)

X-1: AJISPER P B824 (pigment dispersant; produced by Ajinomoto Fine-Techno Co., Inc.)

X-2: DISPERBYK-2013 (pigment dispersant; produced by BYK Chemie GmbH)

X-3: BYK-361N (polyacrylate surface conditioner; produced by BYK Chemie GmbH)

S-1: propyleneglycolmonomethyletheracetate.

Incidentally, the above-described B2-4 component was synthesized in accordance with the procedures described in Synthesis Example B of JP 2019-077674A.

[Preparation of Ink Composition, etc.]

Pigment dispersion liquid and an ink composition were prepared according to respective processes as follows. (Preparation of pigment dispersion liquid) The respective materials were premixed to have ratios listed in Tables 1 and 2, and were subsequently treated by a sand mill for four hours, thereby obtaining the pigment dispersion liquid that contains a predetermined light-shielding agent.

(Manufacture of Ink Composition)

The above-obtained pigment dispersion liquid was sufficiently mixed with the respective components listed in Tables 1 and 2, thereby preparing the ink composition. Incidentally, in each table, content ratios (% by mass) of the components (A) and content ratios (% by mass) of the components (B1) with respect to the entirety of the solid content of the ink composition are listed together.

In addition, in Tables 1 to 2, specific gravity (only the solid content) of the ink composition and volume concentration of the light-shielding agent (A) of the obtained ink composition are described.

Each value of the specific gravity (only the solid content) of the ink composition was obtained by adjusting a temperature of the ink at 20° C. using a thermobath and then measuring true density (true specific gravity) using a buoy.

Incidentally, when obtaining the volume concentration of the light-shielding agent (A), true density of the used pigment was measured as follows.

That is, the true density of the pigment was measured in accordance with Japanese Industrial Standard (JIS standard) JIS Z 8807 (2012). Specifically, 10 g of each pigment was collected into a Gay-Lussac-type specific gravity bottle (pycnometer), a solvent of which specific gravity is lower than that of each pigment was introduced therein, and respective weight of: only the specific gravity bottle; (specific gravity bottle+pigment); (specific gravity bottle+pigment+solvent); (specific gravity bottle+solvent) was measured, and the true density of the pigment was calculated from a following formula.

$$d = \frac{W_b - W_a}{W_b - W_a - W_c + W_d} \times d_0 \quad \text{[Formula 1]}$$

Where d: true density of pigment, $d_0$: density of solvent, $W_a$: weight of specific gravity bottle, $W_b$: weight of (specific gravity bottle+powder), $W_c$: weight of (specific gravity bottle+powder+solvent), $W_d$: weight of (specific gravity bottle+solvent).

Each weight measurement was performed after adjusting the temperature by dipping each sample into a thermobath at 20° C. for one hour.

Further, before measuring the weight of (specific gravity bottle+pigment+solvent), an ultrasonic disperser was used to degas and displace voids in the pigment with the solvent sufficiently.

[Evaluation]

The obtained ink composition was evaluated in accordance with respective items shown below. The obtained evaluation results are as shown in Tables 1 to 2.

Curability

As an inkjet printer, an inkjet printer (Stage JET; produced by TRITEK CO., LTD.) equipped with a piezo-type inkjet head (KM1024iMHE; produced by Konica Minolta, Inc.; ink droplet amount of 13 pL) was prepared. This printer was filled with each ink composition, and ejected each ink composition at a head temperature of 35° C. As coating substrates, Eagle XG (Display Grade Glass produced by Corning (registered trademark)) was used. Further, an amount of the ink composition enabling to form a film thickness for providing transmittance of 0.1% or less at 550 nm was determined as an application amount.

Next, a UV irradiation apparatus (UVX-516 (model number) produced by Ushio Inc., lamp: UVH-0501C-1200 (TYPE) produced by Ushio Inc.) was used to irradiate with ultraviolet rays under following conditions. Further, irradiation intensity and an integrated irradiation dosage at the moment were measured by a digital illuminometer (produced by EYE GRAPHICS COMPANY, model: UVPF-A1, photodetector: PD-365). Condition 1: ultraviolet rays were irradiated at an output of 120 W for 15 seconds. The irradiation intensity was 30 mW/cm$^2$, and the integrated irradiation dosage was 450 mJ/cm$^2$. Condition 2: ultraviolet rays were irradiated at the output of 120 W for 30 seconds. The irradiation intensity was 30 mW/cm$^2$, and the integrated irradiation dosage was 900 mJ/$cm^2$. Condition 3: ultraviolet rays were irradiated at the output of 120 W for 45 seconds. The irradiation intensity was 30 mW/$cm^2$, and the integrated irradiation dosage was 1350 mJ/$cm^2$.

Further, within 10 seconds after the irradiation, a curing state of a coating object was evaluated in accordance with following evaluation criteria.

A . . . The coating object was sufficiently cured, and no tackiness was found.

B . . . Tackiness was found, and fingerprints remained after being touched with a finger, but no ink component adhered to the finger.

C . . . Tackiness was found, and the ink component adhered to the finger when touched with a finger.

<Concealment>

The coating substrates obtained after the UV irradiation in the respective examples and comparative examples were heated by a vault oven set at an inside temperature of 130° C. for 10 minutes, thereby obtaining the evaluation substrates. Incidentally, a UV irradiation dosage in each of the examples and comparative examples was set to be a minimum amount of the UV irradiation dosage providing the curability evaluation value of A. Incidentally, the coating object was not evaluated, if not providing the curability evaluation value of A, even after the irradiation with 1350 mJ/$cm^2$.

Transmittance was measured in a range from 540 nm to 560 nm with an ultraviolet and visible spectrophotometer (using an integrating sphere, SolidSpec-3-700 produced by Shimadzu Corporation), and an average value thereof was defined as transmittance at 550 nm. Concealment was evaluated in accordance with following evaluation criteria.

A: transmittance≤1%

B: transmittance>1%

<External Appearance>

External appearance of the evaluation substrate was evaluated in accordance with following evaluation criteria.

A: No defect was found.

B: Wrinkle was generated near an edge.

C: Wrinkles were generated over the entire coating film.

<Operability>

In the above-described curability test, the number of the coatings required to form the film thickness for providing the transmittance of 1% or less at 550 nm was determined. Tables 1 to 2 show a film thickness formed by single coating, the number of the coatings, and a total film thickness.

Incidentally, in the case of the single coating, the cured film was obtained by: performing inkjet coating; exposing to light; and then applying heat. In the case of double coatings, the cured film was obtained by: performing inkjet coating once; exposing to light; subsequently further performing the inkjet coating and exposing to light once more; and then applying heat. In the case of triple coatings, the cured film was obtained by: repeating a combination of the inkjet coating and the exposure to light three times; and applying heat finally.

Moreover, the operability was evaluated in accordance with following evaluation criteria, and results will be shown in Tables 1 to 2. Usually, as the number of processes is increased, a tact time becomes longer, and probability of irregularities such as contamination with foreign substances is increased, thereby leading to a trend of decrease in a yield rate.

A: single coating

B: double coatings

C: triple coatings or more

Incidentally, in the evaluation of the ink composition of Comparative Example 1, the film thickness of the single coating was set to be 50 μm, and the coating was repeated until the above-mentioned transmittance was satisfied. In this case, the number of the coatings was four, and the evaluation of <Operability> became C (see Comparative Example 1A in Table 1). Then, in the case of limiting the number of the coatings to two (double coatings) while maintaining the condition in which the film thickness of the single coating was set to be 50 μm, the above-described evaluation of <Concealment> became poor (see Comparative Example 1B in Table 1). Incidentally, when increasing the film thickness of the single coating to 90 μm, the evaluations of <Concealment> and <Operability> were relatively well-balanced, but the evaluation of <External appearance> was deteriorated (see Comparative Example 1C in Table 1). Therefore, the ink composition of Comparative Example 1 has a problem in efficient manufacturing of the material with the high light-shielding property.

<Adhesion>

An adhesion evaluation substrate was prepared in the same method as that of the concealment evaluation substrate described above.

Although the concealment evaluation substrate adopted Eagle XG, the adhesion evaluation substrate was manufactured by: coating, in addition to Eagle XG, a glass epoxy substrate (one-side glass epoxy FR-4, produced by Sunhayato Corp) and a glass substrate (trade name: 250, produced by Hiraoka Special Glass Mfg. co., Ltd.) with a transparent conductive film (ITO film) provided thereon, with the ink composition; and curing the ink composition, in the same methods as those of the adhesion evaluation substrate. Incidentally, the ITO film glass substrate was additionally heated in a vault oven set at an inside temperature of 180° C. for 10 minutes.

For evaluating the adhesion, a cross-cut test was carried out in accordance with JIS K5600-5-6:1999, by making cut notches at intervals of 1 mm when the film thickness was less than 60 μm, and at intervals of 2 mm when the film thickness was 60 μm or more, thereby evaluating the adhesion between the cured film and the substrate. With respect to this evaluation, 0 to 4 for each substrate was a range of practical use, but setting within 0 to 3 was more favorable.

0: Cut edges were perfectly smooth and there was no peeling at any cross notches.

1: The coating film was peeled off slightly at an intersection of the cut. The coating films influenced at the crosscut portions were clearly less than 5%.

2: The coating film was peeled off along an cut edge and/or at an intersection. The coating films influenced at the crosscut portions were clearly more than 5% but less than 15%.

3: The coating film was peeled off partially or entirely in a large portion along an cut edge, and/or was peeled off partially or entirely at various parts of the notches. The coating films influenced at the crosscut portions were clearly more than 15% but less than 35%.

4: The coating film was peeled off partially or entirely in a large portion along an cut edge, and/or was peeled off partially or entirely at the several notches. The coating films influenced at the crosscut portions were clearly less than 65%.

5: The coating film was peeled off in either way at an extent that cannot be classified even into Classification 4.

<Pencil Hardness>

A pencil hardness evaluation substrate was prepared in the same way as that of the concealment evaluation substrate described above. Using this evaluation substrate, pencil hardness evaluation was performed in accordance with the test method of JIS-K5600-5-4. A pencil produced by MITSUBISHI PENCIL COMPANY, LIMITED was used for the evaluation with a pencil scratch hardness tester produced by Toyo Seiki Seisaku-sho, Ltd.

TABLE 1

| | | | | Comparative Example 1A | Comparative Example 1B | Comparative Example 1C | Example 1 | Example 2 | Example 3 | Example 4 |
|---|---|---|---|---|---|---|---|---|---|---|
| Composition | Blend of Composition [Part by mass] | Pigment dispersion liquid used | A1-1 | 0.4 | 0.4 | 0.4 | 0.6 | 1 | 1.5 | 3 |
| | | | A2-1 | | | | | | | |
| | | | X-1 | 0.17 | 0.17 | 0.17 | 0.30 | 0.50 | 0.50 | 1 |
| | | | X-2 | | | | | | | |
| | | | B2-1 | 2.1 | 2.1 | 2.1 | 3.1 | 5.2 | 8.0 | 16.0 |
| | | | Total mass | 2.67 | 2.67 | 2.67 | 4.0 | 6.7 | 10.0 | 20 |
| | | B1-1 | | 20 | 20 | 20 | 20 | 20 | 20 | 20 |
| | | B1-2 | | | | | | | | |
| | | B2-1 | | 74.6 | 74.6 | 74.6 | 73.3 | 70.6 | 67.3 | 57.3 |
| | | B2-2 | | | | | | | | |
| | | B2-3 | | | | | | | | |
| | | B2-4 | | | | | | | | |
| | | B2-5 | | | | | | | | |
| | | B2-6 | | | | | | | | |
| | | C1-1 | | 2 | 2 | 2 | 2 | 2 | 2 | 2 |
| | | C1-2 | | | | | | | | |
| | | D1-1 | | 0.5 | 0.5 | 0.5 | 0.5 | 0.5 | 0.5 | 0.5 |
| | | D1-2 | | | | | | | | |
| | | D2-1 | | | | | | | | |
| | | X-3 | | 0.2 | 0.2 | 0.2 | 0.2 | 0.2 | 0.2 | 0.2 |
| | Total solid content of Ink composition S-1 | | | 100.0 | 100.0 | 100.0 | 100.0 | 100.0 | 100.0 | 100.0 |
| | Blend ratio of Component (A) [% by mass] | | | 0.4% | 0.4% | 0.4% | 0.6% | 1.0% | 1.5% | 3.0% |
| | Specific gravity of Ink composition (Solid content only) | | | 1.02 | 1.02 | 1.02 | 1.02 | 1.03 | 1.03 | 1.04 |
| | Blend ratio of Component (A) (Volume concentration) [%] | | | 0.23% | 0.23% | 0.23% | 0.34% | 0.57% | 0.86% | 1.73% |
| | Blend ratio of Component (B1) [% by mass] | | | 20 | 20 | 20 | 20 | 20 | 20 | 20 |
| Evaluation | Curability | Condition 1 | | C | C | C | C | B | B | A |
| | | Condition 2 | | B | B | C | B | A | A | A |
| | | Condition 3 | | A | A | A | A | A | A | A |
| | Concealment, External appearance and Operability | Film thickness by Single coating [μm] | | 50 | 50 | 90 | 50 | 30 | 30 | 15 |
| | | Number of Coating | | 4 | 2 | 2 | 2 | 2 | 1 | 1 |
| | | Total film thickness [μm] | | 200 | 100 | 180 | 100 | 60 | 30 | 15 |
| | | Concealment | | A | B | A | A | A | A | A |
| | | External appearance | | A | A | B | A | A | A | A |
| | | Operability | | C | B | B | B | B | A | A |
| | Adhesion | Eagle XG | | 3 | — | — | 2 | 1 | 2 | 1 |
| | | Glass epoxy (FR4) | | 3 | — | — | 3 | 3 | 3 | 3 |
| | | ITO film glass substrate | | 3 | — | — | 2 | 1 | 2 | 1 |
| | Pencil hardness | | | H | — | — | H | H | H | H |

| | | | | Example 5 | Example 6 | Example 7 | Example 8 | Example 9 | Example 10 |
|---|---|---|---|---|---|---|---|---|---|
| Composition | Blend of Composition [Part by mass] | Pigment dispersion liquid used | A1-1 | 6 | 9 | 12 | 13.5 | 15 | |
| | | | A2-1 | | | | | | 18 |
| | | | X-1 | 2 | 3 | 4 | 4.5 | 5 | |
| | | | X-2 | | | | | | 9.00 |
| | | | B2-1 | 32.0 | 48.0 | 64.0 | 49.5 | 55.0 | 45.0 |
| | | | Total mass | 40 | 60 | 80 | 67.5 | 75 | 72 |
| | | B1-1 | | 20 | 20 | 17.3 | 20 | 15 | 6 |
| | | B1-2 | | | | | | | |
| | | B2-1 | | 37.3 | 17.3 | | 5.8 | 3.3 | 15.3 |
| | | B2-2 | | | | | | | |
| | | B2-3 | | | | | | | |
| | | B2-4 | | | | | | | |
| | | B2-5 | | | | | | | |
| | | B2-6 | | | | | | | |

TABLE 1-continued

| | | | | | | | | |
|---|---|---|---|---|---|---|---|---|
| | | C1-1 | 2 | 2 | 2 | 5 | 5 | 5 |
| | | C1-2 | | | | | | |
| | | D1-1 | 0.5 | 0.5 | 0.5 | 1.5 | 1.5 | 1.5 |
| | | D1-2 | | | | | | |
| | | D2-1 | | | | | | |
| | | X-3 | 0.2 | 0.2 | 0.2 | 0.2 | 0.2 | 0.2 |
| | | Total solid content of Ink composition | 100.0 | 100.0 | 100.0 | 100.0 | 100.0 | 100.0 |
| | | S-1 | | | 15 | 20 | 25 | 10 |
| | | Blend ratio of Component (A) [% by mass] | 6.0% | 9.0% | 12.0% | 13.5% | 15.0% | 18.0% |
| | | Specific gravity of Ink composition (Solid content only) | 1.07 | 1.09 | 1.12 | 1.14 | 1.15 | 1.55 |
| | | Blend ratio of Component (A) (Volume concentration) [%] | 3.57% | 5.45% | 7.47% | 8.55% | 9.58% | 7.15% |
| | | Blend ratio of Component (B1) [% by mass] | 20 | 20 | 17.3 | 20 | 15 | 6 |
| Evaluation | Curability | Condition 1 | B | C | C | C | C | B |
| | | Condition 2 | A | A | B | B | C | A |
| | | Condition 3 | A | A | A | A | A | A |
| | Concealment, External appearance and Operability | Film thickness by Single coating [μm] | 8 | 5 | 4 | 4 | 4 | 12 |
| | | Number of Coating | 1 | 1 | 1 | 1 | 1 | 1 |
| | | Total film thickness [μm] | 8 | 5 | 4 | 4 | 4 | 12 |
| | | Concealment | A | A | A | A | A | A |
| | | External appearance | A | A | A | A | A | A |
| | | Operability | A | A | A | A | A | A |
| | Adhesion | Eagle XG | 1 | 1 | 1 | 2 | 2 | 3 |
| | | Glass epoxy (FR4) | 3 | 3 | 3 | 3 | 3 | 3 |
| | | ITO film glass substrate | 1 | 1 | 1 | 2 | 2 | 4 |
| | | Pencil hardness | H | H | H | <H | H | H |

| | | | | Comparative Example 2 | Comparative Example 3 | Comparative Example 4 | Comparative Example 5 |
|---|---|---|---|---|---|---|---|
| Composition | Blend of Composition [Part by mass] | Pigment dispersion liquid used | A1-1 | 20 | 3 | 13.5 | 13.5 |
| | | | A2-1 | | | | |
| | | | X-1 | 6.7 | 1 | 4.5 | 4.5 |
| | | | X-2 | | | | |
| | | | B2-1 | 53.3 | 16.0 | 49.5 | 49.5 |
| | | | Total mass | 80 | 20 | 67.5 | 67.5 |
| | | B1-1 | | 13.3 | | 24 | 22.5 |
| | | B1-2 | | | | | |
| | | B2-1 | | | 77.3 | 3.3 | 3.3 |
| | | B2-2 | | | | | |
| | | B2-3 | | | | | |
| | | B2-4 | | | | | |
| | | B2-5 | | | | | |
| | | B2-6 | | | | | |
| | | C1-1 | | 5 | 2 | 5 | 5 |
| | | C1-2 | | | | | |
| | | D1-1 | | 1.5 | 0.5 | | |
| | | D1-2 | | | | | |
| | | D2-1 | | | | | 1.5 |
| | | X-3 | | 0.2 | 0.2 | 0.2 | 0.2 |
| | | Total solid content of Ink composition | | 100.0 | 100.0 | 100.0 | 100.0 |
| | | S-1 | | 30 | | 20 | 20 |
| | | Blend ratio of Component (A) [% by mass] | | 20.0% | 3.0% | 13.5% | 13.5% |
| | | Specific gravity of Ink composition (Solid content only) | | 1.19 | 1.03 | 1.14 | 1.14 |
| | | Blend ratio of Component (A) (Volume concentration) [%] | | 13.22% | 1.72% | 8.55% | 8.55% |
| | | Blend ratio of Component (B1) [% by mass] | | 13.3 | 0 | 24 | 22.5 |

TABLE 1-continued

| | | | | | | |
|---|---|---|---|---|---|---|
| Evaluation | Curability | Condition 1 | C | A | C | C |
| | | Condition 2 | C | A | C | C |
| | | Condition 3 | C | A | C | C |
| | Concealment, External appearance and Operability | Film thickness by Single coating [μm] | — | 15 | — | — |
| | | Number of Coating | — | 1 | — | — |
| | | Total film thickness [μm] | — | 15 | — | — |
| | | Concealment | — | A | — | — |
| | | External appearance | — | A | — | — |
| | | Operability | | A | | |
| | Adhesion | Eagle XG | — | 5 | — | — |
| | | Glass epoxy (FR4) | — | 5 | — | — |
| | | ITO film glass substrate | — | 5 | — | — |
| | Pencil hardness | | — | <H | — | — |

TABLE 2

| | | | | Comparative Example 6 | Comparative Example 7 | Example 11 | Example 12 | Example 13 | Example 14 | Example 15 |
|---|---|---|---|---|---|---|---|---|---|---|
| Composition | Blend of Composition [Part by mass] | Pigment dispersion liquid used | A1-1 | 3 | 3 | 3 | 3 | 3 | 3 | 3 |
| | | | A2-1 | | | | | | | |
| | | | X-1 | 1 | 1 | 1 | 1 | 1 | 1 | 1 |
| | | | X-2 | | | | | | | |
| | | | B2-1 | 16 | 16 | 16 | 16 | 16 | 16 | 16 |
| | | | Total mass | 20 | 20 | 20 | 20 | 20 | 20 | 20 |
| | | B1-1 | | 2 | 3 | 9 | 60 | 77.3 | | 20 |
| | | B1-2 | | | | | | | 77.3 | |
| | | B2-1 | | 75.3 | 74.3 | 68.3 | 17.3 | | | 37.3 |
| | | B2-2 | | | | | | | | |
| | | B2-3 | | | | | | | | |
| | | B2-4 | | | | | | | | |
| | | B2-5 | | | | | | | | 20 |
| | | B2-6 | | | | | | | | |
| | | C1-1 | | 2 | 2 | 2 | 2 | 2 | 2 | 2 |
| | | C1-2 | | | | | | | | |
| | | D1-1 | | 0.5 | 0.5 | 0.5 | 0.5 | 0.5 | 0.5 | 0.5 |
| | | D1-2 | | | | | | | | |
| | | D2-1 | | | | | | | | |
| | | X-3 | | 0.2 | 0.2 | 0.2 | 0.2 | 0.2 | 0.2 | 0.2 |
| | Total solid content of Ink composition | | | 100 | 100 | 100 | 100 | 100 | 100 | 100 |
| | S-1 | | | | | | | | | |
| | Blend ratio of Component (A) [% by mass] | | | 3.0% | 3.0% | 3.0% | 3.0% | 3.0% | 3.0% | 3.0% |
| | Specific gravity of Ink composition (Solid content only) | | | 1.03 | 1.03 | 1.03 | 1.07 | 1.09 | 1.08 | 1.07 |
| | Blend ratio of Component (A) (Volume concentration) [%] | | | 1.72% | 1.72% | 1.72% | 1.78% | 1.82% | 1.80% | 1.78% |
| | Blend ratio of Component (B1) [% by mass] | | | 2 | 3 | 9 | 60 | 77.3 | 77.3 | 20 |
| Evaluation | | Curability | Condition 1 | A | A | A | A | A | A | A |
| | | | Condition 2 | A | A | A | A | A | A | A |
| | | | Condition 3 | A | A | A | A | A | A | A |
| | | Concealment, External appearance and Operability | Film thickness by Single coating [μm] | 15 | 15 | 15 | 15 | 15 | 15 | 15 |
| | | | Number of Coating | 1 | 1 | 1 | 1 | 1 | 1 | 1 |
| | | | Total film thickness [μm] | 15 | 15 | 15 | 15 | 15 | 15 | 15 |
| | | | Concealment | A | A | A | A | A | A | A |
| | | | External appearance | A | A | A | A | A | A | A |
| | | | Operability | A | A | A | A | A | A | A |

TABLE 2-continued

| | | | | | | | | | |
|---|---|---|---|---|---|---|---|---|---|
| | Adhesion | Eagle XG | 3 | 2 | 1 | 0 | 0 | 0 | 0 |
| | | Glass epoxy (FR4) | 4 | 3 | 3 | 1 | 1 | 1 | 2 |
| | | ITO film glass substrate | 5 | 5 | 3 | 0 | 0 | 0 | 1 |
| | Pencil hardness | | <H | <H | <H | 3H | 5H | 6H | <H |

| | | | | Example 16 | Example 17 | Example 18 | Example 19 | Example 20 | Example 21 | Example 22 |
|---|---|---|---|---|---|---|---|---|---|---|
| Composition | Blend of Composition [Part by mass] | Pigment dispersion liquid used | A1-1 | 3 | 3 | 3 | 3 | 6 | 6 | 3 |
| | | | A2-1 | | | | | | | |
| | | | X-1 | 1 | 1 | 1 | 1 | 2 | 2 | 1 |
| | | | X-2 | | | | | | | |
| | | | B2-1 | 16 | 16 | 16.0 | 16.0 | 32 | 32 | 16 |
| | | | Total mass | 20 | 20 | 20 | 20 | 40 | 40 | 20 |
| | | B1-1 | | 20 | 20 | 20 | 20 | 20 | 20 | 20 |
| | | B1-2 | | | | | | | | |
| | | B2-1 | | 17.3 | 17.3 | 57.3 | 57.3 | | | 37.3 |
| | | B2-2 | | | | | | | | 20 |
| | | B2-3 | | | | | | 37.3 | | |
| | | B2-4 | | | | | | | 37.3 | |
| | | B2-5 | | 40 | | | | | | |
| | | B2-6 | | | 40 | | | | | |
| | | C1-1 | | 2 | 2 | | 2 | 2 | 2 | 2 |
| | | C1-2 | | | | 2 | | | | |
| | | D1-1 | | 0.5 | 0.5 | 0.5 | | 0.5 | 0.5 | 0.5 |
| | | D1-2 | | | | | 0.5 | | | |
| | | D2-1 | | | | | | | | |
| | | X-3 | | 0.2 | 0.2 | 0.2 | 0.2 | 0.2 | 0.2 | 0.2 |
| | Total solid content of Ink composition | | | 100 | 100 | 100.0 | 100.0 | 100 | 100 | 100 |
| | S-1 | | | | | | | | | |
| | Blend ratio of Component (A) [% by mass] | | | 3.0% | 3.0% | 3.0% | 3.0% | 6.0% | 6.0% | 3.0% |
| | Specific gravity of Ink composition (Solid content only) | | | 1.09 | 1.01 | 1.04 | 1.04 | 1.08 | 1.08 | 1.08 |
| | Blend ratio of Component (A) (Volume concentration) [%] | | | 1.82% | 1.68% | 1.73% | 1.73% | 3.60% | 3.60% | 1.80% |
| | Blend ratio of Component (B1) [% by mass] | | | 20 | 20 | 20 | 20 | 20 | 20 | 20 |
| Evaluation | | Curability | Condition 1 | A | A | A | B | A | A | A |
| | | | Condition 2 | A | A | A | A | A | A | A |
| | | | Condition 3 | A | A | A | A | A | A | A |
| | | Concealment, External appearance and Operability | Film thickness by Single coating [μm] | 15 | 15 | 15 | 15 | 8 | 8 | 15 |
| | | | Number of Coating | 1 | 1 | 1 | 1 | 1 | 1 | 1 |
| | | | Total film thickness [μm] | 15 | 15 | 15 | 15 | 8 | 8 | 15 |
| | | | Concealment | A | A | A | A | A | A | A |
| | | | External appearance | A | A | A | A | A | A | A |
| | | | Operability | A | A | A | A | A | A | A |
| | | Adhesion | Eagle XG | 0 | 0 | 1 | 1 | 1 | 1 | 1 |
| | | | Glass epoxy (FR4) | 1 | 2 | 3 | 3 | 3 | 2 | 3 |
| | | | ITO film glass substrate | 1 | 1 | 1 | 1 | 1 | 1 | 1 |
| | | Pencil hardness | | <H | <H | H | H | 2H | 2H | 2H |

As is understood from the results in this example section, the ink composition of the present embodiment can provide the cured product with excellent balance between the substrate adhesion and the light-shielding property, while maintaining the curability as an ink composition

DESCRIPTION OF SIGN

10: Substrate
20: Light emitting device
30: Light-shielding member
100: Image display apparatus

The invention claimed is:

1. An ink composition, comprising:

a light-shielding agent (A); a cationic polymerizable compound (B); a photoacid generator (C); and a sensitizer (D), wherein volume concentration of the light-shielding agent (A) with respect to total volume of a solid content of the ink composition is 0.3% or more and 12% or less, the cationic polymerizable compound (B) contains a metallic element-containing compound (B1) that includes a cationic polymerizable group and a hydrolyzable group, the metallic element-containing compound (B1) is selected from the group consisting of 3-glycidoxypropyltrimethoxysilane, 3-glycidoxypropyltriethoxysilane, 3-glycidoxypropylmethyldimethoxysilane, 2-(3,4-epoxycyclohexyl)ethyltrimethoxysilane, 2-(3,4-epoxycyclohexyl)ethyltriethoxysilane, 3-[(3-ethyloxetan-3-yl)methoxy]propyl(trimethoxy)silane, 3-[(3-ethyloxetan-3-yl)methoxy]propyl(triethoxy)silane, 3-[(3-methyloxetan-3-yl)methoxy]propyl(trimethoxy)silane and 3-[(3-methyloxetan-3-yl)methoxy]propyl(trimethoxy)silane, a content of the metallic element-containing compound (B1) is 5 parts by mass or more and 80 parts by mass or less, where entirety of the solid content of the ink composition is 100 parts by mass, and the sensitizer (D) contains a compound (D1) having an anthracene skeleton.

2. The ink composition according to claim 1, wherein a content of the light-shielding agent (A) is 0.6 parts by mass or more and 18 parts by mass or less, where the entirety of the solid content of the ink composition is 100 parts by mass.

3. The ink composition according to claim 1, wherein the light-shielding agent (A) contains carbon black (A1) or an inorganic light-shielding agent (A2-1).

4. The ink composition according to claim 1, wherein the cationic polymerizable group included in the metallic element-containing compound (B1) is an epoxy group.

5. The ink composition according to claim 1, wherein the cationic polymerizable compound (B) further contains an other cationic polymerizable compound (B2) that does not correspond to the metallic element-containing compound (B1).

6. The ink composition according to claim 1, wherein the photoacid generator (C) contains a sulfonium salt compound (C1).

7. The ink composition according to claim 1, wherein the ink composition being used for inkjet printing.

8. The ink composition according to claim 1, wherein the ink composition being used for forming a light-shielding member that is provided in an image display apparatus.

9. The ink composition according to claim 8, wherein the light-shielding member is provided in a display area in which images are displayed in the image display apparatus.

10. The ink composition according to claim 9, wherein the image display apparatus includes plural kinds of light emitting devices, and the light-shielding member is provided between the plural kinds of the light emitting devices.

11. A light-shielding member, which is manufactured by curing the ink composition according to claim 1.

12. An image display apparatus, which is configured to include the light-shielding member according to claim 11.

13. The ink composition according to claim 1, wherein the content of the metallic element-containing compound (B1) is 10 parts by mass or more, where entirety of the solid content of the ink composition is 100 parts by mass.

14. The ink composition according to claim 1, wherein a content of the sensitizer (D) is 0.05 parts by mass or more and 6 parts by mass or less, where the entirety of the solid content of the ink composition is 100 parts by mass.

15. The ink composition according to claim 14, wherein a mass ratio of the compound (D1) with respect to entirety of the sensitizer (D) is 80% by mass or more.

* * * * *